(12) United States Patent
King (10) Patent No.: US 8,585,116 B2
(45) Date of Patent: Nov. 19, 2013

(54) VEHICULAR UTILITY BED HAVING END WALL AND SEAT BOTTOM PORTION AND VEHICLES INCLUDING SAME

(75) Inventor: Darin D. King, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 326 days.

(21) Appl. No.: 13/017,529

(22) Filed: Jan. 31, 2011

(65) Prior Publication Data

US 2012/0193931 A1    Aug. 2, 2012

(51) Int. Cl.
*B62D 33/08* (2006.01)

(52) U.S. Cl.
USPC ..................................... 296/24.33; 296/65.01

(58) Field of Classification Search
USPC ............ 296/24.43, 26.01, 26.08, 26.09, 26.1, 296/26.11, 69, 186.4, 65.01, 63, 65.11, 296/65.13, 65.14, 24.33
See application file for complete search history.

(56) References Cited

U.S. PATENT DOCUMENTS

| | | |
|---|---|---|
| 3,840,263 A | 10/1974 | Bowden |
| 4,400,013 A | 8/1983 | Imai |
| 4,480,868 A | 11/1984 | Koto |
| 4,750,778 A | 6/1988 | Hoban |
| 4,813,706 A | 3/1989 | Kincheloe |
| 4,842,458 A | 6/1989 | Carpenter |
| 4,973,082 A | 11/1990 | Kincheloe |
| 5,029,928 A | 7/1991 | Huber |
| 5,044,459 A | 9/1991 | Nishikaji |
| 5,106,121 A | 4/1992 | Boone |
| 5,934,727 A | 8/1999 | Storc et al. |
| 5,979,964 A | 11/1999 | Ban et al. |
| 6,059,499 A | 5/2000 | Bird |
| 6,152,490 A | 11/2000 | Suzuki et al. |
| 6,196,613 B1 | 3/2001 | Arai |
| 6,237,981 B1 | 5/2001 | Selleck |
| 6,416,104 B1 | 7/2002 | Fisher et al. |
| 6,464,279 B1 | 10/2002 | Schambre et al. |
| 6,478,355 B1 | 11/2002 | Van Eden et al. |
| 6,481,772 B1 | 11/2002 | Tenn |
| 6,488,326 B2 | 12/2002 | Wyszogrod et al. |
| 6,517,135 B2 | 2/2003 | de Gaillard |
| 6,547,298 B2 * | 4/2003 | Sotiroff et al. ............. 296/24.43 |

(Continued)

OTHER PUBLICATIONS

Black, Melissa Ann, Final Office Action, Notification Date of Jul. 21, 2011; U.S. Appl. No. 12/477,717; Titled: Vehicle Having Utility Bed and Seat; Filed Jun. 3, 2009; Inventor: David W. Arnold, in its entirety.

(Continued)

*Primary Examiner* — Glenn Dayoan
*Assistant Examiner* — Pinel Romain
(74) *Attorney, Agent, or Firm* — Ulmer & Berne LLP (57) ABSTRACT

A utility bed comprises a bed frame, a bed floor, an end wall, a seat back, and a seat bottom. The bed floor comprises a first and second floor portion. The first floor portion is movably coupled with the bed frame and is movable between a cargo support and an opened position. The end wall is slideably coupled with the bed frame and is slideable between a cargo hauling position and a seating position. The seat back is coupled with the end wall. The seat bottom portion is pinned directly to the end wall and is pivotable about a first axis. When the end wall is slid from the cargo hauling position to the seating position, the seat bottom portion is pivotable from the stored position to the seating position.

20 Claims, 10 Drawing Sheets

(56) References Cited

U.S. PATENT DOCUMENTS

| | | |
|---|---|---|
| 6,557,882 B2 | 5/2003 | Harrington |
| 6,644,709 B2 | 11/2003 | Inagaki et al. |
| D498,435 S | 11/2004 | Saito et al. |
| 6,820,911 B2 | 11/2004 | Furui |
| 6,837,531 B2 | 1/2005 | Mack et al. |
| 6,905,159 B1 | 6/2005 | Saito et al. |
| 6,994,388 B2 | 2/2006 | Saito et al. |
| 7,093,871 B2 * | 8/2006 | Lim et al. .................. 296/26.08 |
| 7,159,922 B2 | 1/2007 | Iyoda et al. |
| 7,249,798 B2 * | 7/2007 | Saito et al. .................. 296/205 |
| 7,364,200 B2 | 4/2008 | Downey |
| 7,367,616 B2 | 5/2008 | Summerford |
| 7,416,238 B2 | 8/2008 | Houston |
| 7,547,057 B2 | 6/2009 | Kim et al. |
| 7,686,368 B2 | 3/2010 | Ghergheli et al. |
| 7,735,894 B2 | 6/2010 | King et al. |
| 7,735,896 B2 | 6/2010 | Kubota |
| 7,762,621 B2 | 7/2010 | Duller |
| 7,841,639 B2 | 11/2010 | Tanaka et al. |
| 8,002,331 B2 | 8/2011 | Bowers |
| 8,075,040 B2 | 12/2011 | Arnold |
| 8,087,694 B2 | 1/2012 | Johnson et al. |
| 8,313,136 B2 | 11/2012 | Arnold et al. |
| 8,348,322 B2 | 1/2013 | King |
| 8,353,534 B2 | 1/2013 | Arnold et al. |
| 2004/0041430 A1 | 3/2004 | Harvey |
| 2005/0140129 A1 | 6/2005 | Miki et al. |
| 2005/0264048 A1 | 12/2005 | Collins |
| 2008/0309112 A1 | 12/2008 | Duller |
| 2009/0256388 A1 | 10/2009 | Tanaka et al. |
| 2009/0322135 A1 | 12/2009 | Ehrhard |
| 2010/0019539 A1 * | 1/2010 | Nakamura et al. ....... 296/190.04 |
| 2010/0308614 A1 * | 12/2010 | Arnold .................. 296/37.6 |
| 2011/0156421 A1 | 6/2011 | Naruoka et al. |
| 2011/0156422 A1 | 6/2011 | Mahara et al. |
| 2011/0156423 A1 | 6/2011 | Kawabata et al. |
| 2011/0169289 A1 | 7/2011 | Arnold et al. |
| 2011/0187178 A1 | 8/2011 | King |
| 2011/0221177 A1 | 9/2011 | Srabstein |

OTHER PUBLICATIONS

U.S. Appl. No. 12/477,717; Titled: Vehicle Having Utility Bed and Seat; filed Jun. 3, 2009; Inventor: David W. Arnold, in its entirety.

U.S. Appl. No. 13/017,529; Titled: Vehicular Utility Bed Having End Wall and Seat Bottom Portion and Vehicles Including Same; filed Jan. 31, 2011; Inventor: Darin D. King, in its entirety.

Black, Melissa Ann, Non-Final Office Action; Notification Date of Feb. 3, 2011; U.S. Appl. No. 12/477,717; Titled: Vehicle Having Utility Bed and Seat; filed: Jun. 3, 2009; Inventor: David W. Arnold, in its entirety.

* cited by examiner

VEHICULAR UTILITY BED HAVING END WALL AND SEAT BOTTOM PORTION AND VEHICLES INCLUDING SAME

TECHNICAL FIELD

A vehicle includes a utility bed. The utility bed includes an end wall and a seat bottom portion that are movable to deploy a rear seat.

BACKGROUND

Certain conventional vehicles include a utility bed that includes a sidewall and a bed floor. The bed floor and the sidewall can cooperate to facilitate retention of cargo in the utility bed for hauling by the vehicle.

SUMMARY

In accordance with one embodiment, a utility bed comprises a bed frame, a bed floor, an end wall, a seat back, and a seat bottom. The bed floor comprises a first floor portion and a second floor portion. The first floor portion is movably coupled with the bed frame and is movable with respect to the bed frame between a cargo support position and an opened position. The end wall is slideably coupled with the bed frame and is slideable between a cargo hauling position and a seating position when the first floor portion is in the opened position. The seat back is coupled with the end wall. The seat bottom portion is pinned directly to the end wall and is pivotable about a first axis with respect to the end wall between a stored position and a seating position. When the end wall is slid from the cargo hauling position to the seating position, the seat bottom portion is pivotable from the stored position to the seating position. When the end wall and the seat bottom portion are in their respective seating positions, the seat back and the seat bottom cooperate to define a rear seat.

In accordance with another embodiment, a vehicle defines a longitudinally extending axis and comprises a vehicular frame, a wheel, and a utility bed. The vehicular frame comprises a support structure. The wheel is rotatably coupled to the vehicular frame. The utility bed is coupled with the vehicular frame and comprises a bed frame, a bed floor, an end wall, a seat back, a seat bottom, and a seat back. The bed floor comprises a first floor portion and a second floor portion. The first floor portion is movably coupled with the bed frame and is movable with respect to the second floor portion between a cargo support position and an opened position. The end wall is slideably coupled with the bed frame and is slideable between a cargo hauling position and a seating position, when the first floor portion is in the opened position. The seat back is coupled with the end wall. The seat bottom portion is pivotally coupled with the end wall. The seat bottom portion is pivotable about a first axis with respect to the end wall between a stored position and a seating position. When the end wall is slid from the cargo hauling position to the seating position, the seat bottom portion contacts the support structure such that the seat bottom portion pivots towards the seating position. The support structure extends transversely to the longitudinally extending axis. The support structure provides underlying support for the seat bottom portion when the seat bottom portion is in the seating position.

In accordance with yet another embodiment, a vehicle defines a longitudinally extending axis and comprises a vehicular frame, a wheel, and a utility bed. The vehicular frame comprises a support structure. The wheel is rotatably coupled to the vehicular frame. The utility bed is coupled with the vehicular frame and comprises a bed frame, a bed floor, a front wall, a seat back, a seat bottom, and a pair of rail members. The bed floor comprises a front floor portion and a rear floor portion. The front floor portion is pivotally coupled with the bed frame and is pivotable with respect to the rear floor portion about a first axis between a cargo support position and an opened position. The front wall slideably coupled with the bed frame and is slideable between a cargo hauling position and a seating position, when the front floor portion is in the opened position. The seat back is coupled with the front wall. The seat bottom portion is pivotally coupled with the front wall. The seat bottom portion is pivotable about a second axis with respect to the front wall between a stored position and a seating position. The front wall is coupled with the rail members to facilitate sliding of the front wall between the cargo hauling position and the seating position. When the front wall is slid from the cargo hauling position to the seating position, the seat bottom portion contacts the support structure which facilitates pivoting of the seat bottom portion towards the seating position. The support structure extends transversely to the longitudinally extending axis. The support structure provides underlying support for the seat bottom portion when the seat bottom portion is in the seating position. The front floor portion overlies the pair of rail members when the front floor portion is in the cargo support position.

BRIEF DESCRIPTION OF THE DRAWINGS

Various embodiments will become better understood with regard to the following description, appended claims and accompanying drawings wherein:

DETAILED DESCRIPTION

Embodiments are hereinafter described in detail in connection with the views of FIGS. 1-8, 9A-9C, and 10A-10C, wherein like numbers indicate the same or corresponding elements throughout the views. A vehicle includes a utility bed which can be used to facilitate hauling of cargo by the vehicle. In one embodiment, the vehicle can be a dump-type vehicle having a utility bed that can facilitate selective dumping of cargo from the utility bed. In other embodiments, a dump-type vehicle can comprise any of a variety of other types of vehicles having a utility bed capable of dumping (e.g., a dump bed) such as, for example, a pickup truck, a dump truck, an all terrain vehicle ("ATV"), and a golf cart, for example. In another embodiment, the vehicle can include a non-dump type vehicle having a utility bed that is rigidly fixed to the vehicle's frame (e.g., a non-dumpable bed). A non-dump-type vehicle can comprise a light utility vehicle, such as a utility vehicle 10 shown in FIGS. 1-8. In yet another embodiment, the vehicle can include a trailer.

Referring again to FIGS. 1-8, the utility vehicle 10 can include a vehicular frame 12. The vehicular frame 12 can include any of a variety of structural and/or decorative rails, panels, and/or other components which are typically, although not necessarily, formed from metal (e.g., steel and/or aluminum. A pair of rear wheels 13 can be rotatably coupled with the vehicular frame 12. The utility vehicle 10 can define a longitudinally extending axis A1 that extends between a front end and a rear end of the utility vehicle.

A front left seat 14 and a front right seat 16 can each be supported by the vehicular frame 12 and can facilitate support of occupants within the vehicle's passenger compartment 18. The utility vehicle 10 can also include a utility bed 20 which is rigidly coupled with the vehicular frame 12. In an alternative embodiment, a utility vehicle can include a utility bed which is coupled with the vehicular frame either directly or indirectly, and such as through use of a hinge assembly. The hinge assembly can facilitate pivotable movement of the utility bed 20 with respect to the vehicular frame 12 of the utility vehicle 10, and between a hauling position and a dumping position. It will be appreciated that any of a variety of known conventional mechanisms or methods (none shown) can be provided to facilitate manual or powered movement of the utility bed 20 between the hauling and dumping positions under control of an operator of the utility vehicle 10.

In the embodiment of FIGS. 1-8, the utility bed 20 is shown to comprise a bed floor 22. The utility bed 20 is also shown to include a left side wall 24 and a right side wall 26 extending generally perpendicularly from the bed floor 22 or generally perpendicularly from locations adjacent to the bed floor 22. The utility bed 20 can also include end walls such as a front wall 28 and a tailgate 30, as illustrated in FIGS. 1-8. In one embodiment, the tailgate 30 can be pivotally coupled with respect to the bed floor 22. In another embodiment, a tailgate can be coupled with the bed floor 22 as shown and described in U.S. Pat. No. 7,735,894, which is herein incorporated by reference in its entirety. The left side wall 24, the right side wall 26, and the front wall 28 can cooperate with the bed floor 22 to retain cargo within the utility bed 20. The tailgate 30, when closed (as shown in FIGS. 1-6), can also cooperate with the left side wall 24, the right side wall 26, and the bed floor 22 to retain cargo within the utility bed 20. It will be appreciated that the tailgate 30 can be selectively opened to facilitate loading and/or unloading of the utility bed 20 from the rear of the vehicle 10. In another embodiment, it will be appreciated that a rear wall can be provided in lieu of a tailgate with the rear wall being rigidly affixed with respect to a bed floor of a utility bed such that it might not be capable of being selectively opened by an operator. In yet another alternative embodiment, it will be appreciated that one or more side walls (e.g., 24 and/or 26) of a utility bed might be capable of being selectively opened (e.g., like tailgate 30) by an operator. In still another alternative embodiment, it will be appreciated that a utility bed might not include any tailgate and/or side walls and might, for example, comprise a flat-bed type configuration (e.g., commonly used for hauling small vehicles).

Figure 1:
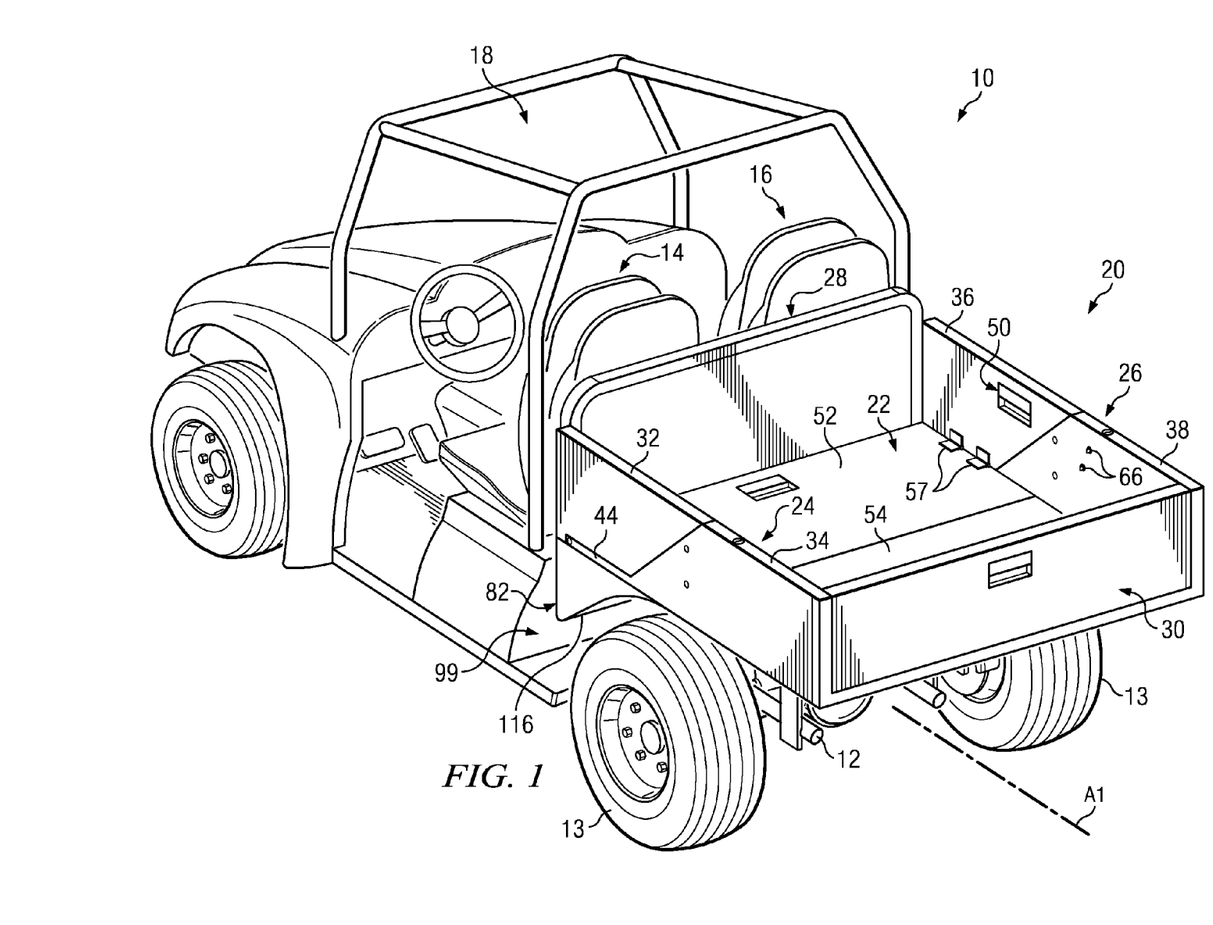
FIG. 1 is a left rear perspective view depicting a vehicle in accordance with one embodiment.
Figure 2:
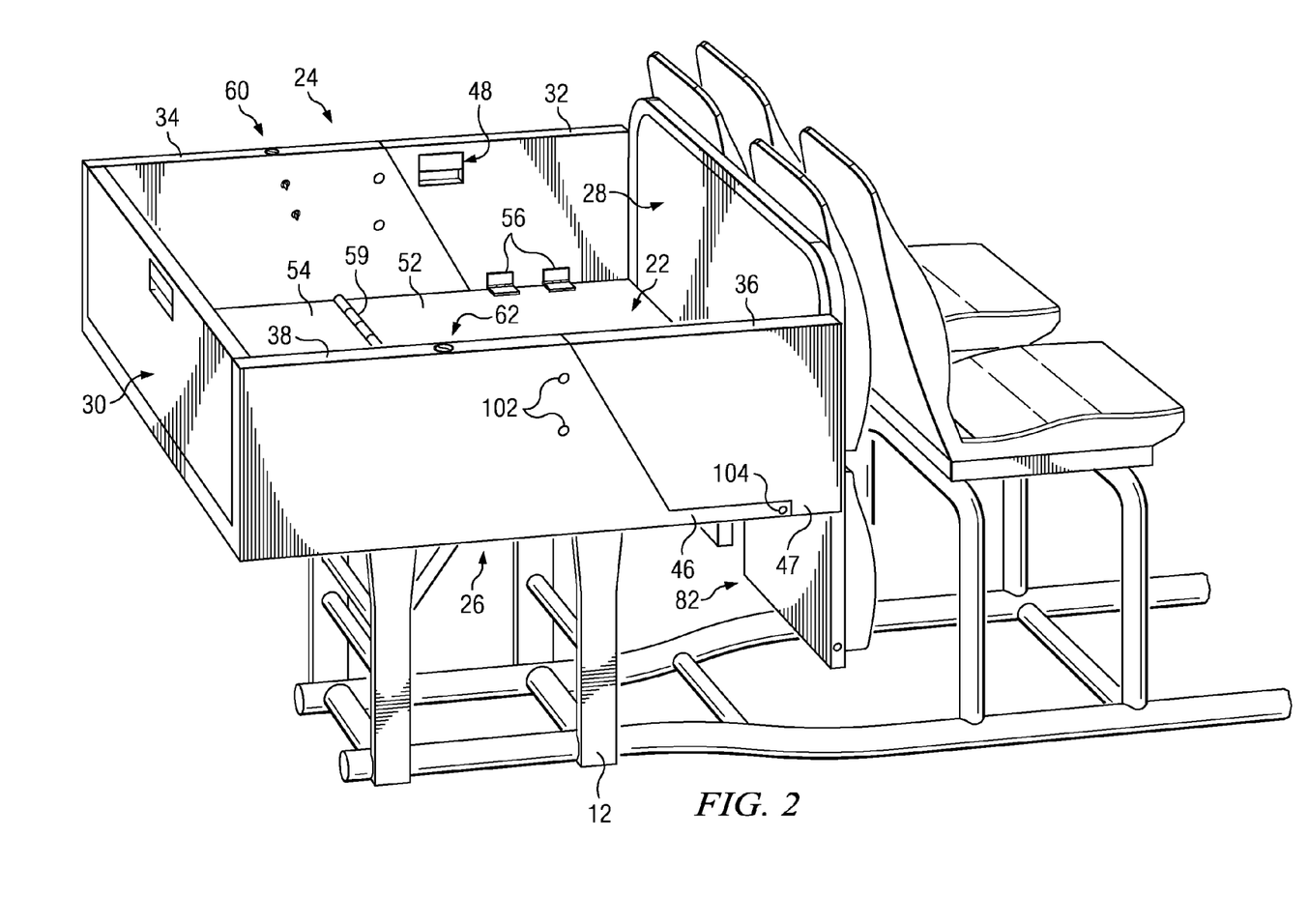
FIG. 2 is a right rear perspective view depicting a utility bed and various other components of the vehicle of FIG. 1, wherein a front floor is shown in a cargo support position, left and right doors in closed positions, a front wall in a cargo hauling position, and a seat bottom portion in a stored position.
Figure 3:
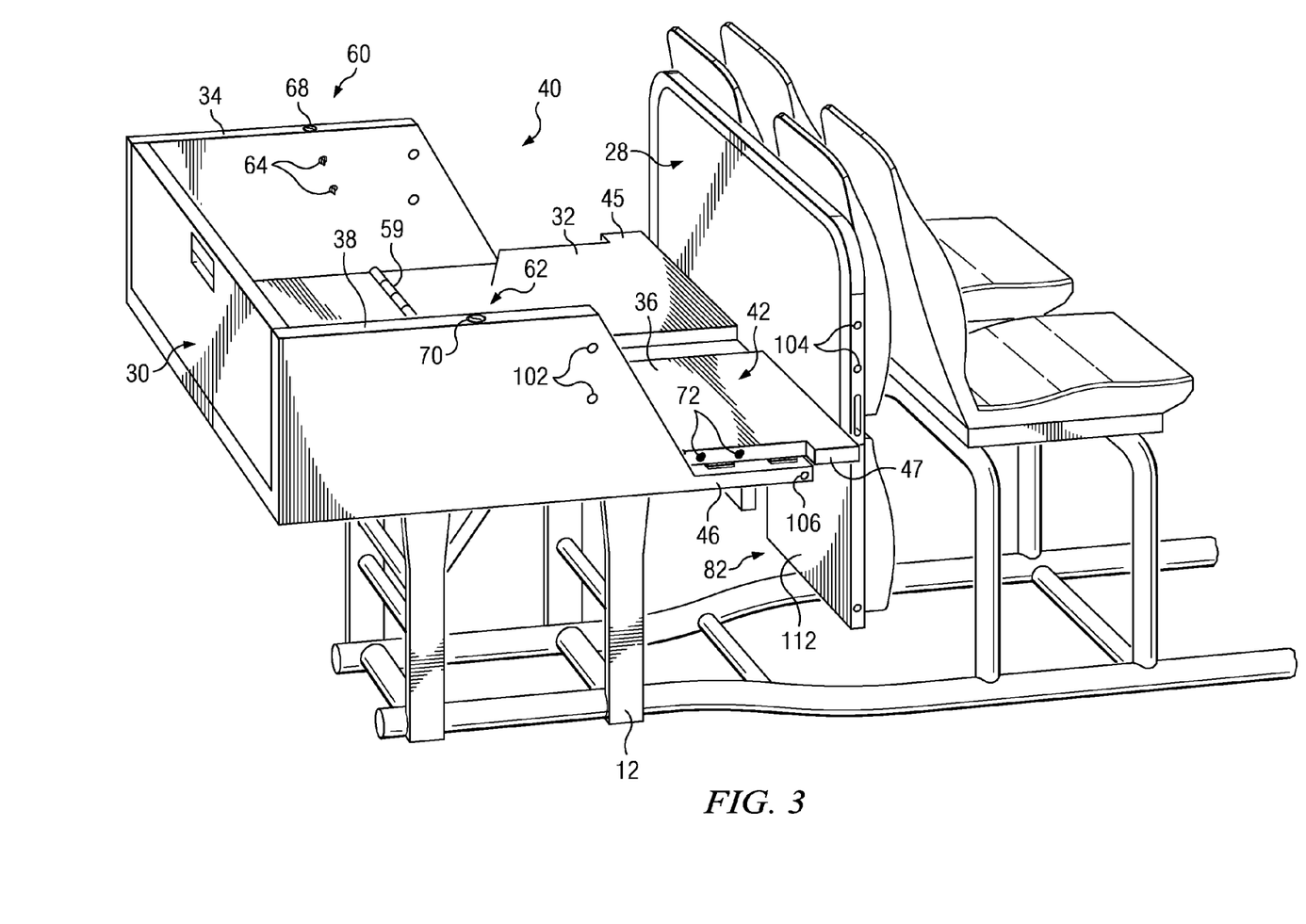
FIG. 3 is a right rear perspective view similar to FIG. 2 but with the left and right doors in opened positions.

As illustrated in FIGS. 1-3, the left sidewall 24 can include a left door 32 and a left rear sidewall portion 34. The right sidewall 26 can include a right door 36 and a right rear sidewall portion 38. The left and right doors 32, 36 can each be pivotable between a closed position (FIG. 2) and an opened position (FIG. 3). When in the closed position, each of the left and right doors 32, 36 can cooperate with the bed floor 22, the front wall 28, and the remaining portions of the left and right rear sidewall portions 34, 38 to retain cargo within the utility bed 20. When the left and right doors 32, 36 are moved to the opened position, the left and right rear sidewall portions 34, 38 can remain upright such that left and right openings 40, 42 (FIG. 3) are defined.

The left and right sidewalls 24, 26 and the left and right doors 32, 36 can be configured to ensure that the utility bed 20 maintains proper aesthetics when the left and right doors 32, 36 are in the closed positions. As illustrated in FIGS. 1 and 3, the left and right sidewalls 24, 26 can each define a respective lower horizontally extending portion 44, 46, and the left and right doors 32, 36 can include respective protruding portions 45, 47. When the left and right doors 32, 36 are in their respective closed positions, the lower horizontally extending portions 44, 46 can cooperate with the protruding portions 45, 47 to give the appearance of substantially continuous left and right sidewalls 24, 26.

In one embodiment, a seal can be provided along the perimeter of each of the left and right doors 32, 36. Each seal can facilitate selective sealing of the interaction between the doors 32, 36, the respective rear sidewall portion 34, 38, and the lower horizontally extending portion 44, 46 of the left and right sidewall 24, 26. In one embodiment, the left and right doors 32, 36 can each include a manually-operated handle (e.g., 48, 50) that facilitates selective securing of the respective door (e.g., 32, 36) in the closed position.

As illustrated in FIG. 2, the bed floor 22 can include a front floor 52 and a rear floor 54. The left and right doors 32, 36 can be pivotally attached to the front floor 52 such that, when the left and right doors 32, 36 are in the opened position, they can each lie substantially parallel with and against the front floor 52. In one embodiment, the left and right doors 32, 36 can be pivotally coupled with the front floor 52 with respective pairs of hinges 56, 57 (shown in FIGS. 1 and 2). In other embodiments, however, left and right doors can be movably coupled with a bed floor in any of a variety of suitable alternative arrangements.

Figure 4:
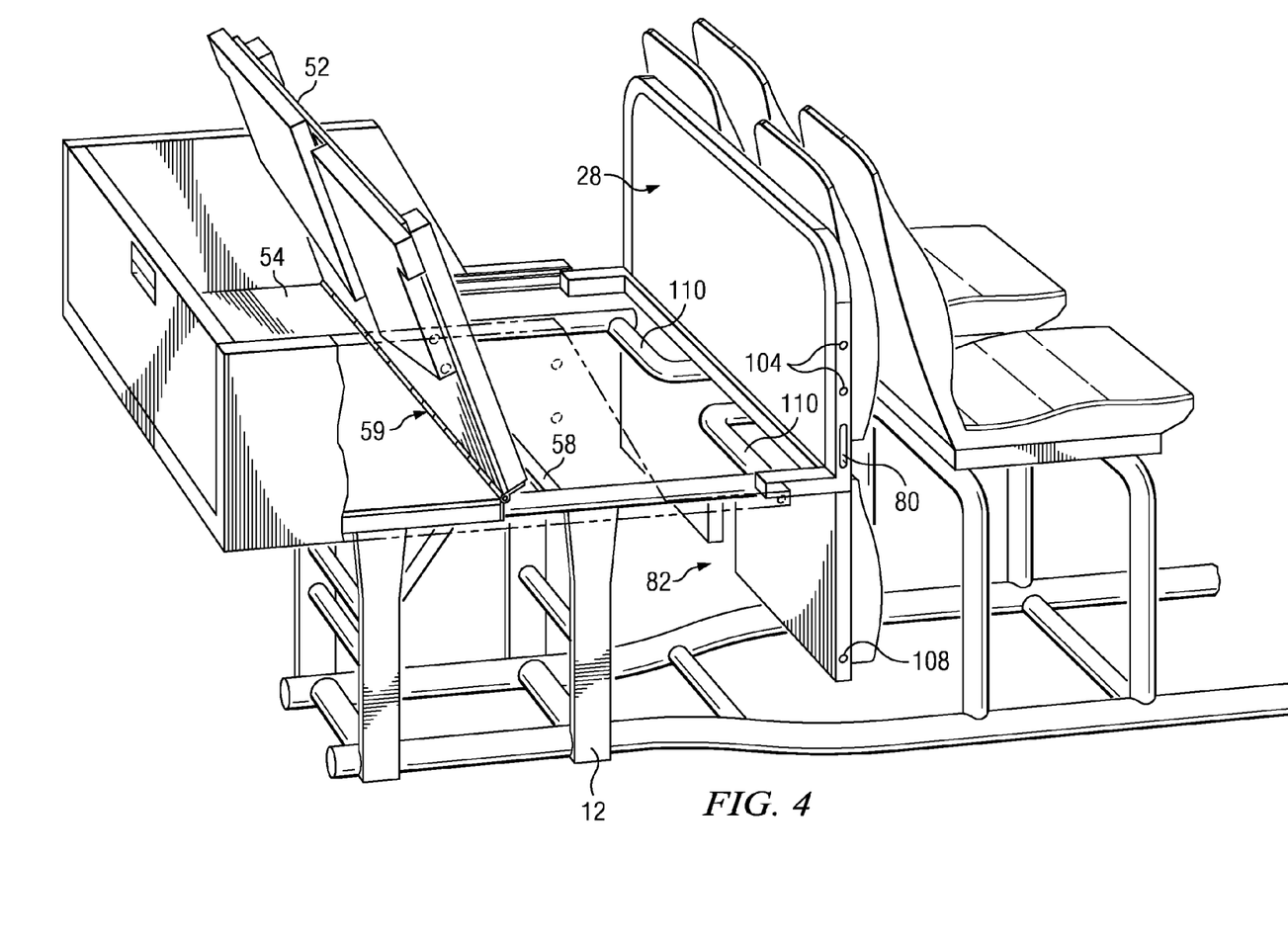
FIG. 4 is a right rear perspective view similar to FIG. 3 but with the front floor of the utility bed pivoted into an opened position.
Figure 5:
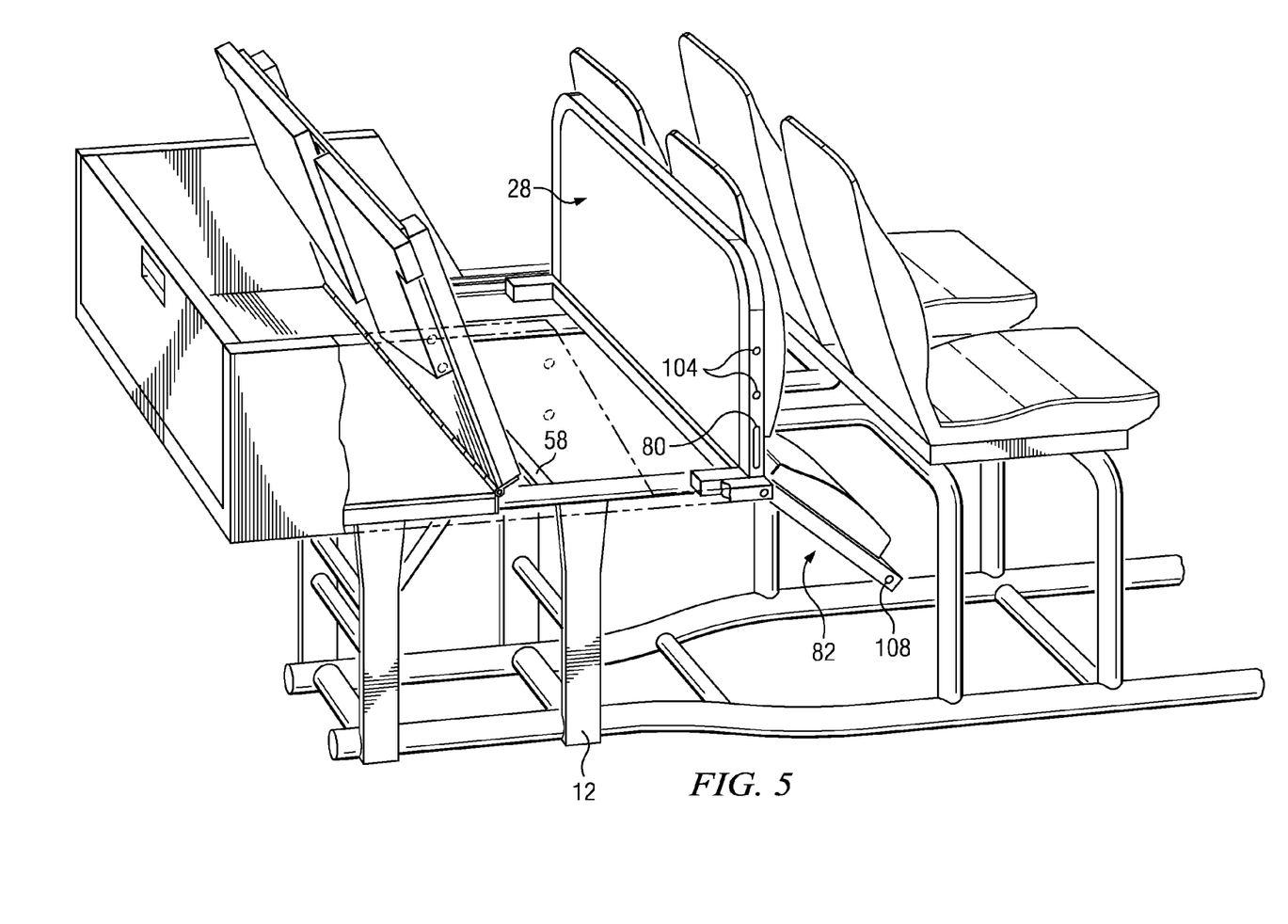
FIG. 5 is a right rear perspective view similar to FIG. 4 but with the front wall of the utility bed positioned between the cargo hauling position and a seating position, and the seat bottom portion positioned between the stored position and a seating position.
Figure 6:
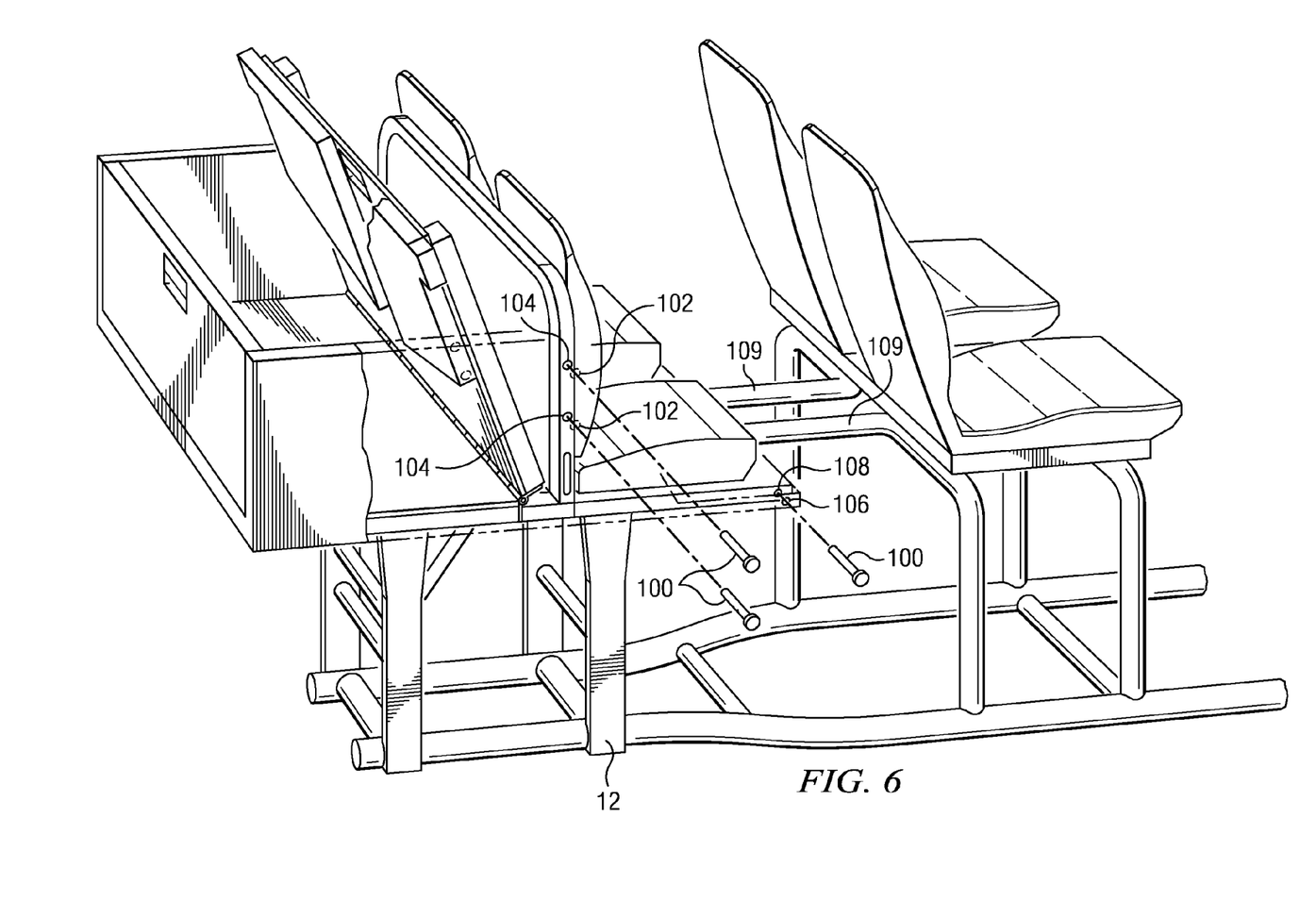
FIG. 6 is right rear perspective view similar to FIG. 5 but with the front wall and the seat bottom portion of the utility bed in their seating positions.

As illustrated in FIG. 4, with the left and right doors 32, 36 in the opened position, the front floor 52 can pivot with respect to the rear floor 54 from a cargo support position (FIGS. 2 and 3) to an opened position (FIG. 4). In one embodiment, as illustrated in FIGS. 4-6, with the front floor 52 in the opened position, the front and rear floors 52, 54 can define an acute angle. As illustrated in FIG. 4, the utility bed 20 can include a bed frame 58 that at least partially underlies the bed floor 22. The bed frame 58 can comprise a tubular frame structure that extends underneath the bed floor 22 to provide underlying support for the bed floor 22, the left and right sidewalls 24, 26, and/or the front wall 28. It will be appreciated that a bed frame can be provided in any of a variety of suitable alternative arrangements. For example, a bed frame might be integrally formed as part of a bed floor such as in a one-piece bed floor/bed frame configuration.

The front floor 52 is shown in FIGS. 4-6 to be pivotally attached to the rear floor 54 with a hinge 59 to facilitate pivoting of the front floor 52 between the cargo support position and the opened position. In other embodiments, however, it will be appreciated that a front floor can be movably coupled with a bed frame in any of a variety of suitable alternative arrangements. For example, a front floor can be pivotally attached directly to a bed frame. In another example, a front floor can be removable from the bed frame to facilitate manual positioning of the front floor in the cargo support position or seating position. It will be appreciated that any of a variety of known conventional mechanisms or methods (none shown) can be provided to facilitate manual or powered movement of a front floor between the cargo support position and the opened position. For example, a front floor can include a selectively concealable handle (not shown) which can be grasped by a user to manually move the front floor between the opened and cargo support positions. In another embodiment, an electronic linear actuator can be coupled with each of a rear floor and the bed frame to facilitate powered movement of the front floor.

In one embodiment, the rear floor 54 can be fixed with respect to the bed frame 58 such as through welded attachment. However, in other embodiments, the rear floor 54 can be pivotally or otherwise movably attached to the bed frame 58. For example, the rear floor 54 can be pivotally attached to the bed frame 58 to facilitate selective access to the area underlying the utility bed 20 (e.g., facilitating access to the bed frame 58). It will be appreciated however, a bed floor can be provided in any of a variety of suitable alternative arrangements.

As illustrated in FIGS. 1-3, the utility bed 20 can include left and right locking mechanisms 60, 62 that can be configured to selectively retain the front floor 52 in the opened position. The left and right locking mechanisms 60, 62 can be associated with respective left and right sidewalls 24, 26 to facilitate retention of the front floor 52 in the opened position. In one embodiment, as illustrated in FIG. 3, the left and right locking mechanisms 60, 62 can include a pair of latches (64 shown in FIGS. 2-4, 66 shown in FIG. 1) that are operably coupled with a respective handle 68, 70. Each pair of latches 64, 66 can correspond with a respective pair of receptacles (e.g., 72 shown in FIG. 3) defined by the left and right doors 32, 36. When the front floor 52 is in the opened position, the latches 64, 66 can extend into corresponding receptacles (e.g., 72) to retain the front floor 52 in the opened position. Rotation of the handles 68, 70 can retract the latches 64, 66 to release the front floor 52 from the opened position. In one embodiment, the latches 64, 66 can be biased to an extended position (e.g., with springs) and can be moved to a retracted position when contacted by the front floor 52 as it moves into the opened position (e.g., similar to a conventional setback latch arrangement found on a conventional house door).

Figure 7:
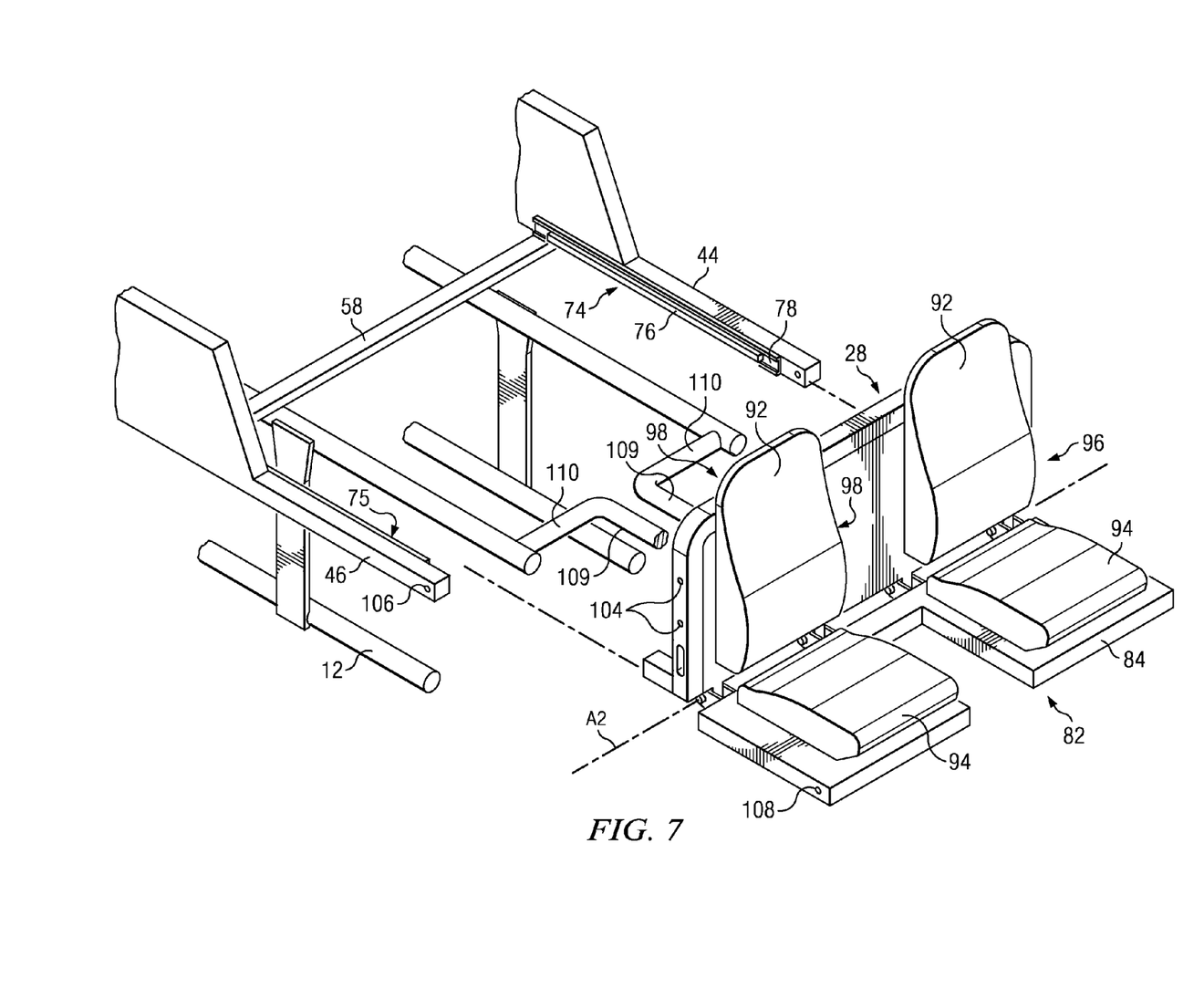
FIG. 7 is an exploded view depicting the front wall and the seat bottom portion apart from the remainder of the utility bed with certain other components removed for clarity of illustration.

As illustrated in FIGS. 4-6, the front wall 28 can be slideably coupled with the bed frame 58 such that the front wall 28 is slidable between a cargo hauling position (FIG. 4) and a seating position (FIG. 6). In one embodiment, as illustrated in FIG. 7, the utility bed 20 can include left and right slide rails 74, 75 that extend substantially parallel with the longitudinally extending axis A1 of the utility vehicle 10. The left and right slide rails 74, 75 can each include an inner member (e.g., 76) that is slideably supported by an outer member (e.g., 78), such as with bearings (not shown), for example. The inner members (e.g., 76) of the left and right side rails 74, 75 can be coupled with respective left and right sides of the front wall 28 (e.g., with bolts or through welded attachment). The outer member (e.g., 78) of each left and right slide rail 74, 75 can be coupled with the respective left and right side walls 24, 26 below the respective left and right openings 40, 42 (e.g., attached to the lower horizontally extending members 44, 46), such as with bolts (not shown), for example. The front wall 28 can thus extend between, and can be substantially transverse to, the left and right rails 74, 75. The inner members (e.g., 76) of the slide rails 74, 75 can slide with respect to the outer rails (e.g., 78) to facilitate sliding of the front wall 28 between the cargo hauling position (FIG. 4) and the seating position (FIG. 6). In another embodiment, a pair of slide rails can be attached directly to a bed frame (e.g., 58). It will be appreciated that, any of a variety of other suitable slideable arrangements can facilitate slideable coupling of a front wall, directly or indirectly, with a bed frame.

When the front floor 52 is in the cargo support position, the front floor 52 can overlie the left and right slide rails 74, 75 and can prevent the front wall 28 from moving to the seating position. When the front floor 52 is in the opened position, the front wall 28 is permitted to move to the seating position. With the front wall 28 in the seating position, the front floor 52 can be positioned adjacent to, and rearward of, the front wall 28.

In one embodiment, as illustrated in FIG. 5, the front wall 28 can include a handle 80. The handle 80 can accommodate a user's hand to facilitate manual movement of the front wall 28 between the cargo hauling position and the seating position. Although the handle 80 is shown to be a recess, it will be appreciated that any of a variety of suitable alternative handle configurations can be provided, such as a U-shaped handle. It will also be appreciated that any of a variety of known conventional mechanisms or methods (none shown) can be provided to facilitate powered movement of a front wall between the cargo hauling position and the seating position. For example, an electronic linear actuator can be coupled with each of the front wall and the bed frame to facilitate powered movement of the front wall.

Figure 8:
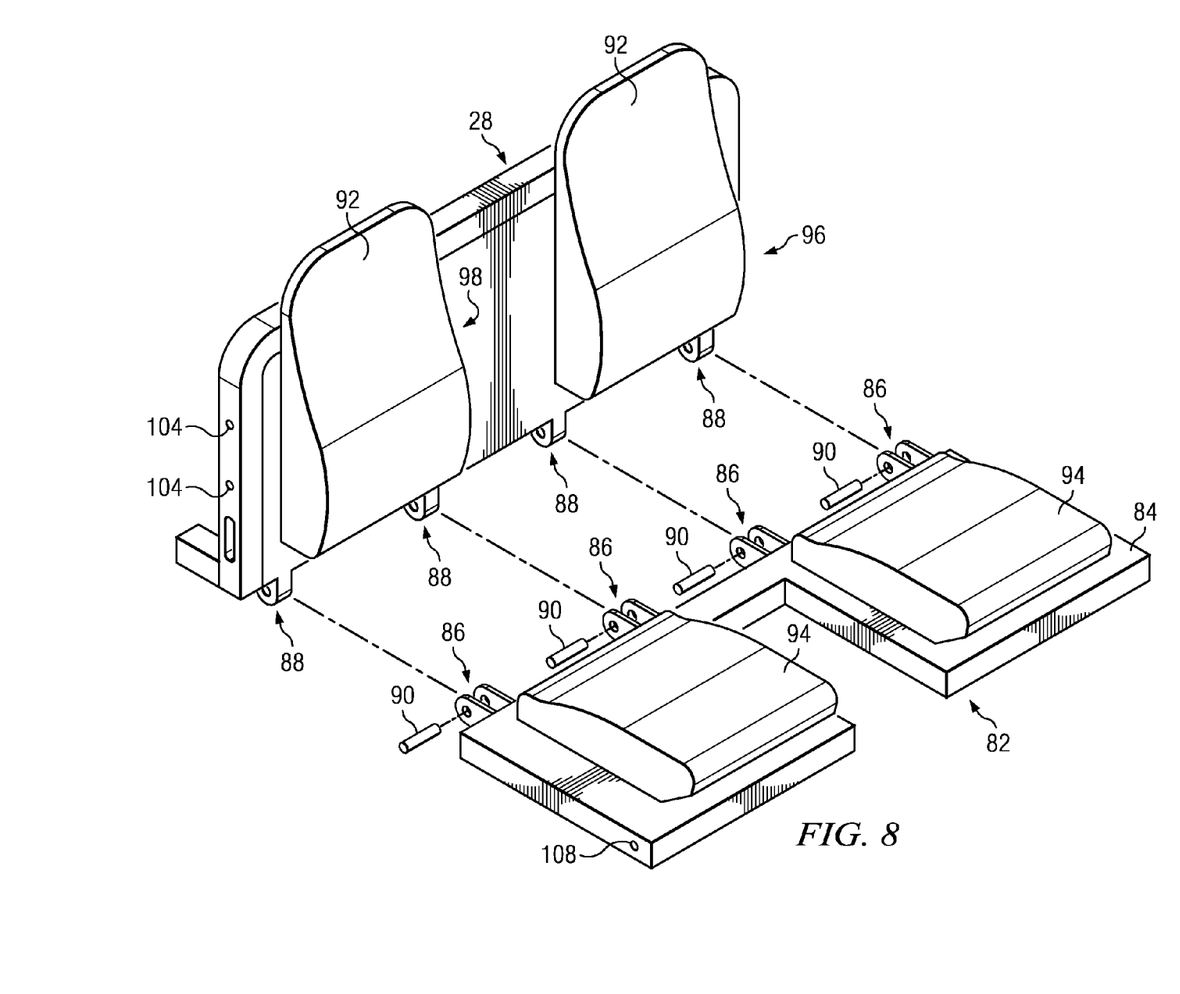
FIG. 8 is an exploded view depicting the front wall and the bottom seat portion.

As illustrated in FIGS. 1-8, the vehicle 10 can include a seat bottom portion 82 pinned directly to the front wall 28. As illustrated in FIG. 8, the seat bottom portion 82 can include a base portion 84 that includes a plurality of female hinge members 86. The front wall 28 can include a plurality of male hinge members 88. Each of the male hinge members 88 can be pivotally coupled together with one of the female hinge members 86 with a respective pin 90. The seat bottom portion 82 can thus pivot with respect to the front wall 28 about an axis A2 (FIG. 7) that extends through the male and female hinge members 86, 88 (e.g., through front wall 28). It will be appreciated that a seat bottom portion can be pinned directly to a front wall in any of a variety of suitable alternative configurations. It will also be appreciated that, in other embodiments, a seat bottom portion can be pivotally coupled with a front wall in a variety of other suitable alternative configurations such as for example, with hinges.

As illustrated in FIGS. 4-6, when the front wall 28 is slid rearwardly (e.g., from the cargo hauling position to the seating position), the seat bottom portion 82 is pivotable from a stored position (FIGS. 2-4) to a seating position (FIG. 6). When in the stored position the seat bottom portion 82 can reside in a foot well 99 in a vertical orientation beneath the front wall 28. As illustrated in FIGS. 4-6, a pair of seat backs 92 can be coupled with the front wall 28 and a pair of seat bottoms 94 can be coupled with the base portion 84 of the seat bottom portion 82. When the front wall 28 is moved to the seating position, the seat bottom portion 82 can be pivoted into the seating position such that it no longer resides in the foot well 99. When the front wall 28 and the seat bottom portion 82 are in their seating positions, as illustrated in FIG. 6, the seat backs 92 and seat bottoms 94 can cooperate to provide left and right rear seats 96, 98 and the foot well 99 can accommodate legs of passengers seated upon the left or right rear seats 96, 98.

When in the stored position, the seat bottom portion 82 can be partially obscured from plain sight by the utility bed 20. In addition, since the seat bottom portion 82 is located in front of the rear wheels 13, the vertical space beneath the utility bed can more effectively accommodate a rear suspension, rear axle, and/or rear wheels. For example, if the seat bottom portion were stored horizontally beneath a front floor, the height and travel of shock absorbers might need to be reduced to accommodate for the limited vertical space occupied by the bed floor portion.

The front wall 28 and the seat bottom portion 82, when in their seating positions, can be releasably coupled with the sidewalls (e.g., 24, 26) and the bed frame 58, respectively. In one embodiment, as illustrated in FIG. 6, the front wall 28 and the bed floor portion 82 can be secured to the left and right rear sidewall portions 34, 38 with detent members 100. The right rear sidewall portion 38 can define a pair of apertures 102 (FIG. 3) and the lower horizontally extending portion 46 of the right sidewall 26 can define an aperture 106. When the front wall 28 is in the seating position, a pair of the detent members 100 can be provided through respective apertures 102 of the right rear sidewall portion 38 and into apertures 104 defined by the front wall 28 (e.g., in an interference fit) to secure the front wall 28 to the right rear sidewall portion 38. Similarly, when the seat bottom portion 82 is in the seating position, one of the detent members 100 can be provided through the aperture 106 in the lower horizontally extending portion 46 of the right rear sidewall portion 38 and into an aperture 108 defined by the seat bottom portion 82 (e.g., in an interference fit) to secure the seat bottom portion 82 to the right rear sidewall portion 38. Left sides of the front wall 28 and the seat bottom portion 82 can be secured to the left rear sidewall portion 34 in a similar manner. It will be appreciated that a front wall and/or seat bottom portion can be releasably secured in a seating position in any of a variety of suitable alternative arrangements such as with latches or through electrical constraint of a motorized linear actuator coupled between the front wall and bed frame, for example.

As illustrated in FIGS. 4-7, the vehicular frame 12 can include longitudinal frame members 109 that extend substantially parallel with the longitudinally extending axis A1 and from beneath the utility bed 20 toward the front seats 14, 16. The configuration of the longitudinal frame members 109 can provide access to the foot well 99 that might otherwise be obstructed by a conventional vehicular frame. For example, a conventional vehicular frame might extend entirely beneath the left and right sidewalls 34, 38 and thus obstruct passenger access to the foot well 99 when the rear seats, 96, 98 are deployed. Such a conventional vehicular frame might require a passenger to climb over the vehicular frame when embarking or disembarking to/from the rear seats 96, 98. In one embodiment, as illustrated in FIGS. 7 and 8, the bed floor portion 82 can be provided in a substantially U-shaped configuration. When the seat bottom portion 82 is in the stored position, the seat bottom portion 82 can accommodate the longitudinal frame members 109 between the seat bottoms 94. It will be appreciated that a vehicular frame and/or a bed frame can be provided in any of a variety of configurations that accommodate passenger access to a foot well when rear seats are deployed. It will also be appreciated that a seat bottom portion can be provided in any of a variety of suitable configurations to accommodate passage of a vehicular frame and/or bed frame from beneath a utility bed toward front seats.

Figure 9A:
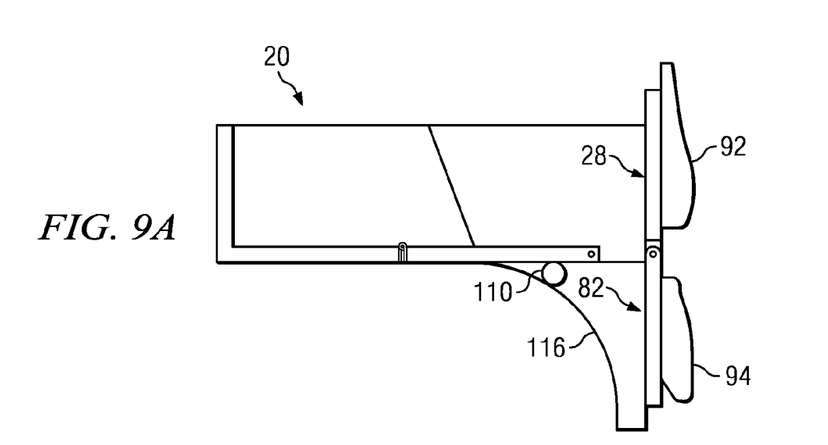
FIG. 9A is a schematic view of the utility bed with the front wall in the cargo hauling position and the seat bottom portion in the stored position, according to one embodiment.
Figure 9B:
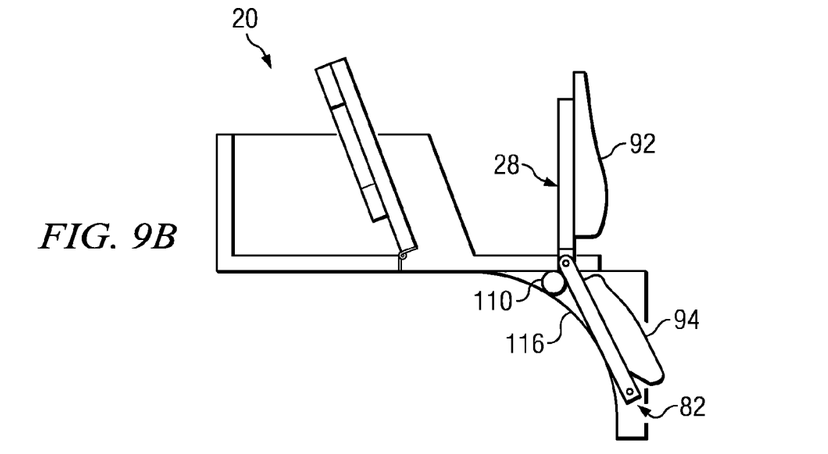
FIG. 9B is a schematic view of the utility bed similar to FIG. 9A but with the front wall positioned between the cargo hauling position and the seating position, and the seat bottom portion positioned between the stored position and the seating position.
Figure 9C:
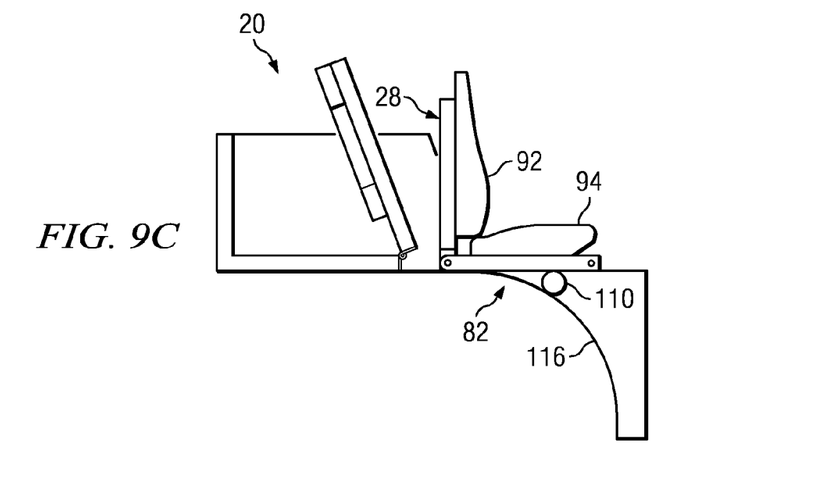
FIG. 9C is a schematic view of the utility bed similar to FIG. 9B but with the front wall and the seat bottom portion in their respective seating positions.

In one embodiment, as illustrated in FIG. 7, the vehicular frame 12 can include a pair of lateral frame members 110 that are coupled with the longitudinal frame members 109. The lateral frame members 110 can extend transversely to the longitudinally extending axis A1. During sliding of the front wall 28 to the seating position, the lateral frame members 110 contact a bottom surface (112 in FIG. 3) of the seat bottom portion 82 to pivot the seat bottom portion 82 towards the seating position. The lateral frame members 110 can thus effectively guide the seat bottom portion 82 into the seating position when the front wall 28 is slid from the cargo hauling position to the seating position. For example, as illustrated in FIG. 9A, the lateral frame members 110 can be disposed at least partially beneath the utility bed 20 and rearward of the front wall 28, when the front wall 28 is in the cargo hauling position. With the front wall 28 in the cargo hauling position and the seat bottom portion 82 in the stored position, the seat bottom portion 82 can be spaced longitudinally from the lateral frame members 110 and a wheel well wall 116, as shown in FIGS. 1 and 9A. As illustrated in FIG. 9B, as the front wall 28 moves toward the seating position, the seat bottom portion 82 can contact the lateral frame members 110 and the wheel well wall 116. As the front wall 28 continues to move rearwardly toward the seating position, the seat bottom portion 82 rides along the lateral frame members 110 and the wheel well wall 116 such that the lateral frame members 110 and wheel well wall 116 can facilitate pivoting of the seat bottom portion 82 into the seating position. As illustrated in FIG. 9C, when the front wall 28 and the seat bottom portion 82 are in the seating position, the lateral frame members 110 can provide underlying support for the seat bottom portion 82. In one embodiment, the lateral frame members 110 can cooperate with the detent members (e.g., 100 in FIG. 6) to support the seat bottom portion 82 with respect to the bed frame 58.

Figure 10A:
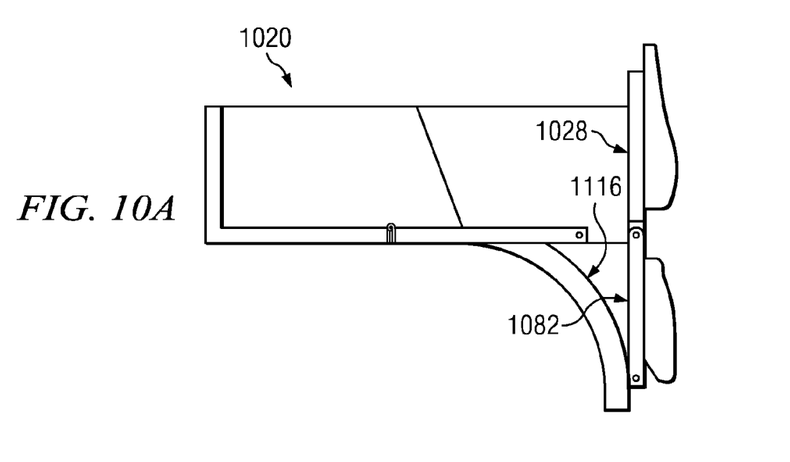
FIG. 10A is a schematic view of the utility bed with the front wall in the cargo hauling position and the seat bottom portion in the stored position, according to another embodiment.
Figure 10B:
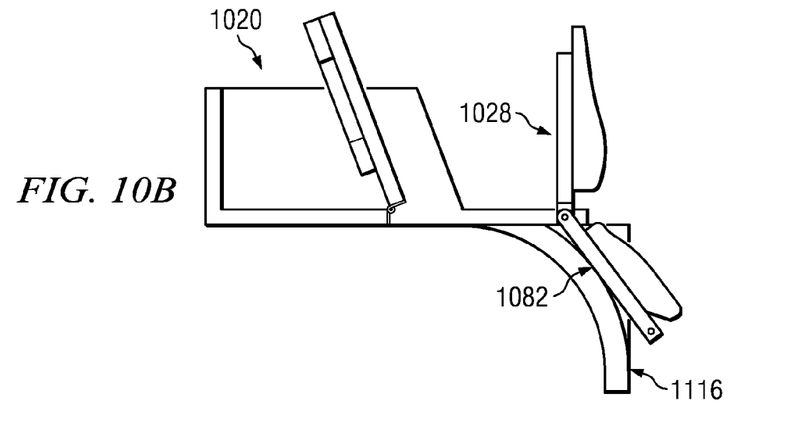
FIG. 10B is a schematic view of the utility bed similar to FIG. 10A but with the front wall positioned between the cargo hauling position and the seating position, and the seat bottom portion positioned between the stored position and the seating position.
Figure 10C:
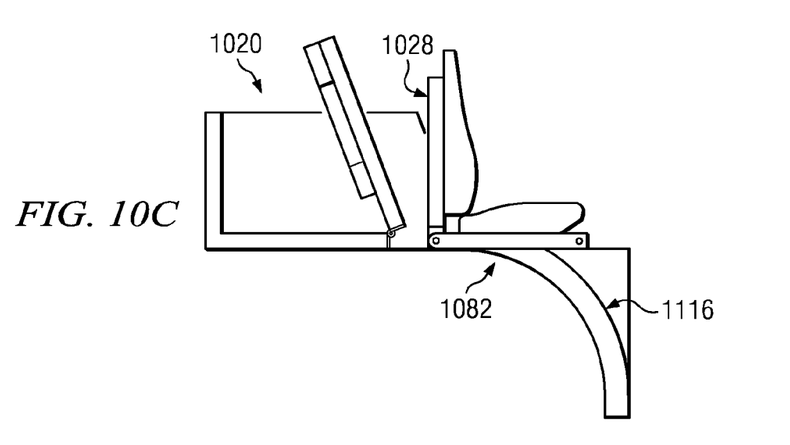
FIG. 10C is a schematic view of the utility bed similar to FIG. 10B but with the front wall and the seat bottom portion in their respective seating positions.

It will be appreciated that a variety of suitable alternative support structures can facilitate pivoting of the seat bottom portion 82 into a seating position when the front wall 28 is moved to the seating position. In one alternative embodiment, as illustrated in FIG. 10A, a utility bed 1020 can include a wheel well wall 1116 that is disposed beneath the utility bed 1020 without any intervening lateral frame members (e.g., 110) between the wheel well wall 1116 and the utility bed 1020. As illustrated in FIG. 10B, as a front wall 1028 moves into a seating position, a seat bottom portion 1082 contacts the wheel well wall 1116. As the front wall 1020 continues to slide rearwardly, the seat bottom portion 1082 rides along the wheel well wall 1116 such that the wheel well wall 1116 facilitates pivoting of the seat bottom portion 1082 into the seating position. As illustrated in FIG. 10C, when the front wall 1028 and the seat bottom portion 1082 are in the seating position, the wheel well wall 1116 can provide underlying support for the seat bottom portion 1082.

It will be appreciated that a support structure can include any of a variety of components and/or any of a variety of materials. For example, a support structure can be overlaid with an elastomeric material. It will also be appreciated that in some embodiments, a support structure might not underlie the utility bed to facilitate pivoting to a seat bottom portion into seating position. In these embodiments, the seat bottom portion might be pivoted into a seating position manually or through automation (e.g., with a linear motor) and independent of movement of the front wall 28.

It will be appreciated, that although the embodiment of FIGS. 1-8 illustrates forward facing rear seats 96, 98 which are disposed towards a rearmost portion of the utility bed 20, rear seats can be provided on a utility bed in any of a variety of suitable alternative arrangements. In one embodiment, the rear wall can be configured to provide rearward facing seats disposed at a frontmost portion of the utility bed. The rear wall of the utility bed can include seat backs and can be slideably coupled with the bed frame. A seat bottom portion can include seat bottoms and can be pivotally coupled with the rear wall. Sliding the rear wall into a seating position pivots the seat bottom portion into a seating position such that the seat backs cooperate with the seat bottoms to define rearwardly facing left and right rear seats. In such an embodiment, the left and right side walls may or may not include respective left and right side doors since the rear seats can be accessed from the rear of the vehicle.

Although the embodiments above have been described with respect to individual left and right rear seats, it will be appreciated that in other embodiments the utility bed can include more than two rear seats or less than two rear seats. In yet another embodiment, the utility bed can provide left and right seats that can be deployed independent of each other. In such an embodiment, a front wall can be bifurcated into left and right portions. A seat back can be coupled with each left and right portion of the front wall. A seat bottom portion can be similarly bifurcated into left and right portions. A seat bottom can be coupled with each left and right portion. In such an arrangement, left and right rear seats can be individually and selectively erected from the utility bed. It will also be appreciated that rear seats can be provided along a utility bed in any of a variety of suitable alternative arrangements. For example, rear seats can be rigidly affixed to a bed floor of a utility bed.

While various embodiments of a vehicle have been illustrated by the foregoing description and have been described in detail with respect to FIGS. 1-8, 9A-9C, and 10A-10C, it is not intended to be exhaustive or to limit the scope of the appended claims to such detail. Numerous modifications are possible in light of the above teachings. Some of those modifications have been discussed and others will be understood by those skilled in the art.

What is claimed is:

1. A utility bed comprising:
    a bed frame;
    a bed floor comprising a first floor portion and a second floor portion, the first floor portion being movably coupled with the bed frame and movable with respect to the second floor portion between a cargo support position and an opened position;
    an end wall slideably coupled with the bed frame and slidable between a cargo hauling position and a seating position when the first floor portion is in the opened position;
    a seat back coupled with the end wall; and
    a seat bottom portion pinned directly to the end wall and pivotable about a first axis with respect to the end wall between a stored position and a seating position; wherein:
    when the end wall is slid from the cargo hauling position to the seating position, the seat bottom portion is pivotable from the stored position to the seating position; and
    when the end wall and the seat bottom portion are in their respective seating positions, the seat back and the seat bottom portion cooperate to define a rear seat.

2. The utility bed of claim 1 wherein the end wall comprises a front wall, the first floor portion comprises a front floor and the second floor portion comprises a rear floor.

3. The utility bed of claim 1 wherein the first floor portion is pivotally coupled with the second floor portion.

4. The utility bed of claim 1 wherein the seat bottom portion is releasably coupled with the bed frame when the seat bottom portion is in the seating position.

5. A utility bed comprising:
    a bed frame;
    a bed floor comprising a first floor portion and a second floor portion, the first floor portion being movably coupled with the bed frame and movable with respect to the second floor portion between a cargo support position and an opened position;
    an end wall slideably coupled with the bed frame and slidable between a cargo hauling position and a seating position when the first floor portion is in the opened position;
    a seat back coupled with the end wall; and
    a seat bottom portion pinned directly to the end wall and pivotable about a first axis with respect to the end wall between a stored position and a seating position; wherein:
    when the end wall is slid from the cargo hauling position to the seating position, the seat bottom portion is pivotable from the stored position to the seating position;
    when the end wall and the seat bottom portion are in their respective seating positions, the seat back and the seat bottom portion cooperate to define a rear seat; and
    the end wall is releasably coupled with the side wall when the end wall is in the seating position.

6. The utility bed of claim 5 wherein the first floor portion is positioned adjacent to, and rearward of, the end wall, when the first floor portion is in the opened position and the end wall is in the seating position.

7. The utility bed of claim 6 wherein the first floor portion and the second floor portion define an acute angle, when the first floor portion is in the opened position and the end wall is in the seating position.

8. The utility bed of claim 1 further comprising a pair of rail members, wherein the end wall is coupled with the rail members to facilitate sliding of the end wall between the cargo hauling position and the seating position, and the first floor portion overlies the pair of rail members when the first floor portion is in the cargo support position.

9. A vehicle defining a longitudinally extending axis and comprising:
    a vehicular frame comprising a support structure;
    a wheel rotatably coupled to the vehicular frame; and
    a utility bed coupled with the vehicular frame and comprising:

a bed frame;

a bed floor comprising a first floor portion and a second floor portion, the first floor portion being movably coupled with the bed frame and movable with respect to the bed frame between a cargo support position and an opened position;

an end wall slideably coupled with the bed frame and slidable between a cargo hauling position and a seating position when the first floor portion is in the opened position;

a seat back coupled with the end wall; and a seat bottom portion pivotally coupled with the end wall, the seat bottom portion being pivotable about a first axis with respect to the end wall between a stored position and a seating position; wherein:

when the end wall is slid from the cargo hauling position to the seating position, the seat bottom portion contacts the support structure such that the seat bottom portion pivots towards the seating position;

the support structure extends transversely to the longitudinally extending axis; and the support structure provides underlying support for the seat bottom portion when the seat bottom portion is in the seating position.

10. The vehicle of claim 9 wherein the seat bottom portion is longitudinally spaced from the support structure when the seat bottom portion is in the stored position.

11. The vehicle of claim 9 wherein the support structure comprises one of a frame member and a wheel well wall.

12. The vehicle of claim 9 wherein the end wall comprises a front wall, the first floor portion comprises a front floor and the second floor portion comprises a rear floor.

13. The vehicle of claim 9 wherein the first floor portion is pivotally coupled with the second floor portion.

14. The vehicle of claim 9 wherein the seat bottom portion is releasably coupled with the bed frame when the seat bottom portion is in the seating position.

15. The vehicle of claim 9 wherein the end wall is releasably coupled with the side wall when the end wall is in the seating position.

16. The vehicle of claim 9 wherein the utility bed further comprises a pair of rail members, wherein the end wall is coupled with the rail members to facilitate sliding of the end wall between the cargo hauling position and the seating position, and the first floor portion overlies the pair of rail members when the first floor portion is in the cargo support position.

17. The vehicle of claim 16 wherein the pair of rail members extends substantially parallel with the longitudinally extending axis, the support structure is substantially transverse to the pair of rail members, and the end wall extends between and is transverse to the pair of rail members.

18. A vehicle defining a longitudinally extending axis and comprising:

a vehicular frame comprising a support structure;

a wheel rotatably coupled to the vehicular frame; and a utility bed coupled with the vehicular frame and comprising:

a bed frame;

a bed floor comprising a front floor portion and a rear floor portion, the front floor portion being pivotally coupled with the bed frame and pivotable with respect to the rear floor portion about a first axis between a cargo support position and an opened position;

a front wall slideably coupled with the bed frame and slideable between a cargo hauling position and a seating position when the front floor portion is in the opened position;

a seat back coupled with the front wall; and a seat bottom portion pivotally coupled with the front wall, the seat bottom portion being pivotable about a second axis with respect to the front wall between a stored position and a seating position;

a pair of rail members, the front wall being coupled with the rail members to facilitate sliding of the front wall between the cargo hauling position and the seating position, wherein:

when the front wall is slid from the cargo hauling position to the seating position, the seat bottom portion contacts the support structure which facilitates pivoting of the seat bottom portion towards the seating position;

the support structure extends transversely to the longitudinally extending axis;

the support structure provides underlying support for the seat bottom portion when the seat bottom portion is in the seating position; and the front floor portion overlies the pair of rail members when the front floor portion is in the cargo support position.

19. The vehicle of claim 18 wherein the pair of rail members extends substantially parallel with the longitudinally extending axis, the support structure is substantially transverse to the pair of rail members, and the front wall extends between and is transverse to the pair of rail members.

20. The vehicle of claim 18 wherein the seat bottom portion is pinned directly to the front wall.

* * * * *